US010824329B2

(12) United States Patent
Proctor

(10) Patent No.: US 10,824,329 B2
(45) Date of Patent: Nov. 3, 2020

(54) METHODS AND SYSTEMS FOR DISPLAYING QUERY STATUS INFORMATION ON A GRAPHICAL USER INTERFACE

(71) Applicant: MOTOROLA SOLUTIONS, INC., Chicago, IL (US)

(72) Inventor: Lee M. Proctor, Cary, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 36 days.

(21) Appl. No.: 15/714,434

(22) Filed: Sep. 25, 2017

(65) Prior Publication Data

US 2019/0095090 A1    Mar. 28, 2019

(51) Int. Cl.
*G06F 3/0488* (2013.01)
*G06F 16/242* (2019.01)
(Continued)

(52) U.S. Cl.
CPC ...... *G06F 3/04883* (2013.01); *G06F 3/04812* (2013.01); *G06F 3/167* (2013.01); *G06F 16/2428* (2019.01); *G06F 16/2455* (2019.01)

(58) Field of Classification Search
CPC ........ G06F 3/011; G06F 3/017; G06F 3/0304; G06F 3/0325; G06F 3/038; G06F 3/0481; G06F 3/04812; G06F 3/04815; G06F 3/0482; G06F 3/0484; G06F 3/04842; G06F 3/0488; G06F 3/04883; G06F 3/04886; G06F 3/167; G06F 17/30047; G06F 17/30253; G06F 17/30256; G06F 17/30268; G06F 17/30277; G06F 17/30477; G06F 17/3053; G06F 17/30554; G06F 17/30696; G06F 17/30864; G06F 17/30867;
(Continued)

(56) References Cited

U.S. PATENT DOCUMENTS 6,026,409 A * 2/2000 Blumenthal .......... G06F 16/338
7,693,842 B2    4/2010 Hinckley et al.
(Continued)

OTHER PUBLICATIONS

PCT/US2018/047951 International Search Report and Written Opinion of the International Searching Authority dated Oct. 23, 2018 (14 pages).

*Primary Examiner* — Reza Nabi
*Assistant Examiner* — Hwei-Min Lu
(74) *Attorney, Agent, or Firm* — Michael Best and Friedrich, LLP

(57) ABSTRACT

Methods and systems for displaying query status information on a graphical user interface. One system includes an electronic computing device that includes one or more electronic processors communicatively coupled to a touch sensitive display. The one or more electronic processors are configured to read a gesture made on the touch sensitive display, generate a query based on the gesture, and display a displayed gesture on the touch sensitive display. The displayed gesture substantially encloses an area of the touch sensitive display. The one or more electronic processors are further configured to generate a response to the query, configure the area on the touch sensitive display substantially enclosed by the displayed gesture to be a button, receive an input indicating that the button has been touched, and output the response to the query.

20 Claims, 6 Drawing Sheets

(51) Int. Cl.
*G06F 16/2455* (2019.01)
*G06F 3/0481* (2013.01)
*G06F 3/16* (2006.01)

(58) Field of Classification Search
CPC ......... G06F 17/30398; G06F 17/30991; G06F 2203/0381; G06F 1/163; G06K 9/00288; G06K 9/00335; G06K 9/00355; G06K 9/72; G06K 2209/01; G06Q 30/02; G06Q 30/0641; G06Q 50/22
USPC ......... 715/863; 707/769, 722, E17.014, 723; 345/156, 173
See application file for complete search history.

(56) References Cited

U.S. PATENT DOCUMENTS

| | | | | |
|---|---|---|---|---|
| 7,765,200 | B2* | 7/2010 | Kandil | G06F 11/362 707/713 |
| 9,733,739 | B1 | 8/2017 | Yates et al. | |
| 2003/0095143 | A1* | 5/2003 | Lauris | G06F 8/34 715/762 |
| 2006/0190430 | A1* | 8/2006 | Luo | G06F 16/284 |
| 2009/0083676 | A1* | 3/2009 | Flanagan | G06F 3/0481 715/853 |
| 2011/0038512 | A1* | 2/2011 | Petrou | G06F 3/0481 715/853 |
| 2011/0302524 | A1* | 12/2011 | Forstall | G06F 11/362 707/713 |
| 2011/0320949 | A1* | 12/2011 | Ohki | G06F 3/04883 715/769 |
| 2012/0262386 | A1 | 10/2012 | Kwon et al. | |
| 2013/0006957 | A1* | 1/2013 | Huang | G06F 16/24578 382/116 |
| 2013/0275411 | A1 | 10/2013 | Kim et al. | |
| 2014/0046934 | A1* | 2/2014 | Zhou | G06F 16/24526 707/723 |
| 2014/0053091 | A1* | 2/2014 | Hou | G06F 3/04883 715/769 |
| 2014/0101178 | A1* | 4/2014 | Ginter | G06F 16/24578 |
| 2014/0280114 | A1* | 9/2014 | Keysar | G06F 16/9535 707/730 |
| 2014/0310613 | A1 | 10/2014 | Megiddo et al. | |
| 2015/0106399 | A1 | 4/2015 | Hinckley | |
| 2015/0169067 | A1* | 6/2015 | Hong | G06F 3/0481 715/853 |
| 2016/0063106 | A1* | 3/2016 | Chai | G06F 16/951 707/722 |
| 2016/0188652 | A1* | 6/2016 | Goo | G06F 16/27 707/667 |
| 2017/0004173 | A1* | 1/2017 | Simitsis | G06F 16/24542 |
| 2017/0024121 | A1 | 1/2017 | Park et al. | |
| 2018/0004780 | A1* | 1/2018 | Walker | G06F 16/284 |

* cited by examiner

METHODS AND SYSTEMS FOR DISPLAYING QUERY STATUS INFORMATION ON A GRAPHICAL USER INTERFACE

BACKGROUND OF THE INVENTION

Devices with touch sensitive displays such as tablets, laptops, phones (for example, cellular or satellite), interactive whiteboards, and other interactive displays and communication devices are now in common use by users, such as first responders (including firemen, police officers, and paramedics, among others). Users of such devices may desire to obtain information (for example, vehicle histories, arrest records, outstanding warrants, health information, and the like), send instructions, or perform other tasks by interacting with the touch sensitive display.

Many such devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
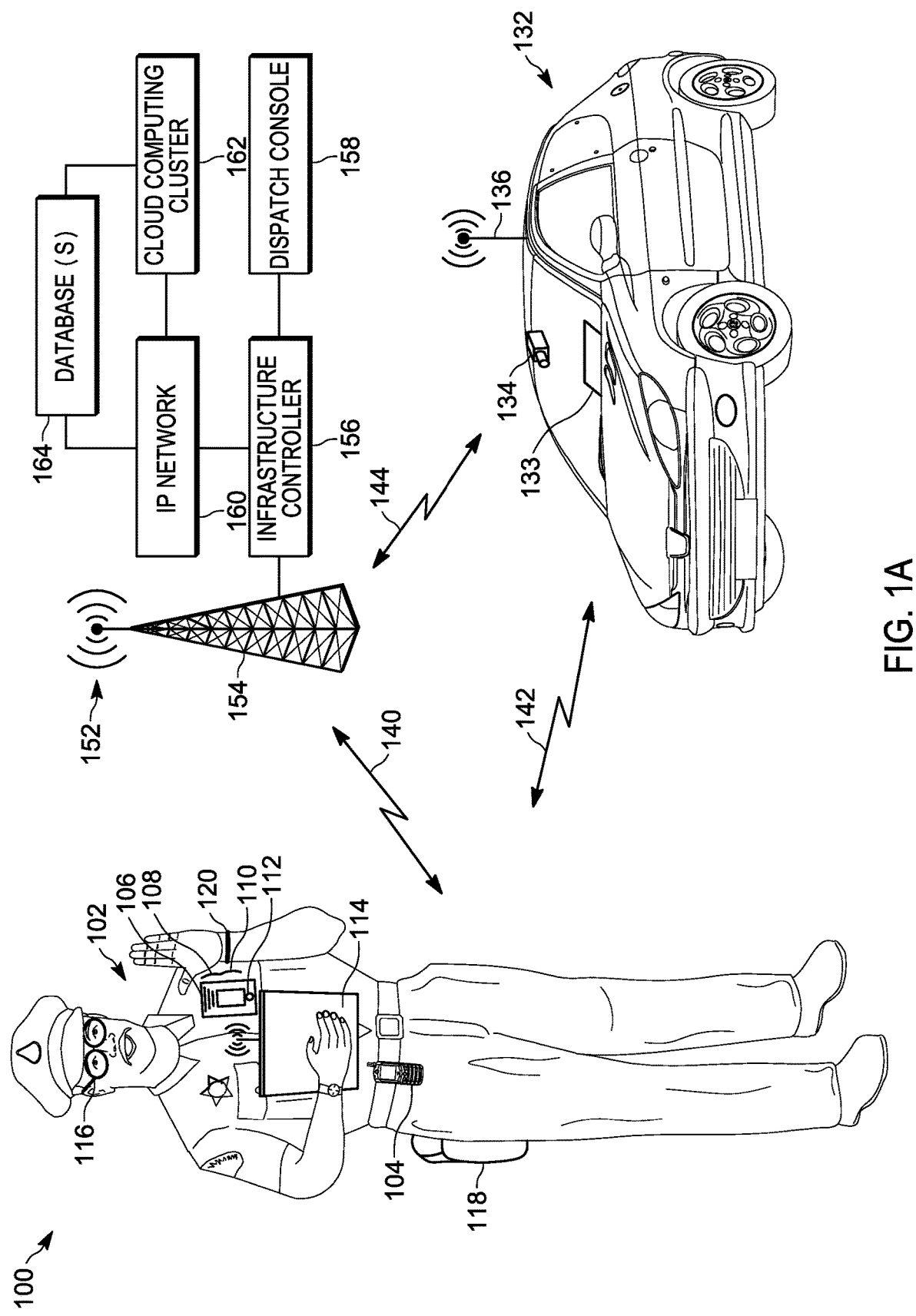
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Devices with touch sensitive displays are often used to access or provide access to electronic digital assistants. An electronic digital assistant may provide a device user with valuable information in response to a user query input to the device. Examples of user queries include a parsed natural language input, an electronic touch interface manipulation, or another user input. In some instances, the electronic digital assistant may take a noticeable amount of time to generate a response to the user query (for example, five seconds, twenty seconds, one minute, or longer). For example, when the user query requires the electronic digital assistance to reference one or more remotely-located databases, the electronic digital assistant may not be able to immediately generate a response to the user query.

There is a technological problem with how users interact with such devices because such devices may not display the status of the user query or independent statuses of multiple independent user queries. Additionally, when responses to multiple user queries are generated in parallel over the same or overlapping periods of time, the display on such devices may become cluttered which may prevent information from being understood by the user.

Disclosed are a method, device, and system for an electronic digital assistant to display query status information on a graphical user interface. The electronic digital assistant may change a format of a displayed gesture on the graphical user interface based on a status of a user query. The electronic digital assistant may also configure an area on the graphical user interface that is substantially enclosed by the displayed gesture to be a button in response to the response to the user query being generated.

One embodiment provides an electronic computing device that includes a touch sensitive display and one or more electronic processors communicatively coupled to the touch sensitive display. The one or more electronic processors are configured to read a gesture made on the touch sensitive display, and generate a query based on the gesture. The one or more electronic processors are further configured to display, based on the gesture, a displayed gesture on the touch sensitive display. The displayed gesture substantially encloses an area of the touch sensitive display. The one or more electronic processors are further configured to generate a response to the query, and configure the area on the touch sensitive display substantially enclosed by the displayed gesture to be a button. The one or more electronic processors are further configured to receive an input on the touch sensitive display indicating that the area on the touch sensitive display substantially enclosed by the displayed gesture has been touched. The one or more electronic processors are further configured to output the response, with an output device, in response to receiving the input indicating that the area on the touch sensitive display substantially enclosed by the displayed gesture has been touched.

Another embodiment provides a method of displaying query status information on a graphical user interface. The method includes reading, with an electronic computing device, a gesture made on a touch sensitive display. The method further includes generating, with the electronic computing device, a query based on the gesture. The method further includes displaying, based on the gesture, a displayed gesture on the touch sensitive display. The displayed gesture substantially encloses an area of the touch sensitive display. The method further includes generating, with the electronic computing device, a response to the query. The method further includes configuring, with the electronic computing device, the area on the touch sensitive display substantially enclosed by the displayed gesture to be a button. The method further includes receiving an input on the touch sensitive display indicating that the area on the touch sensitive display substantially enclosed by the displayed gesture has been touched. The method further includes outputting the response, with an output device, in response to receiving the input indicating that the area on the touch sensitive display substantially enclosed by the displayed gesture has been touched.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1B:
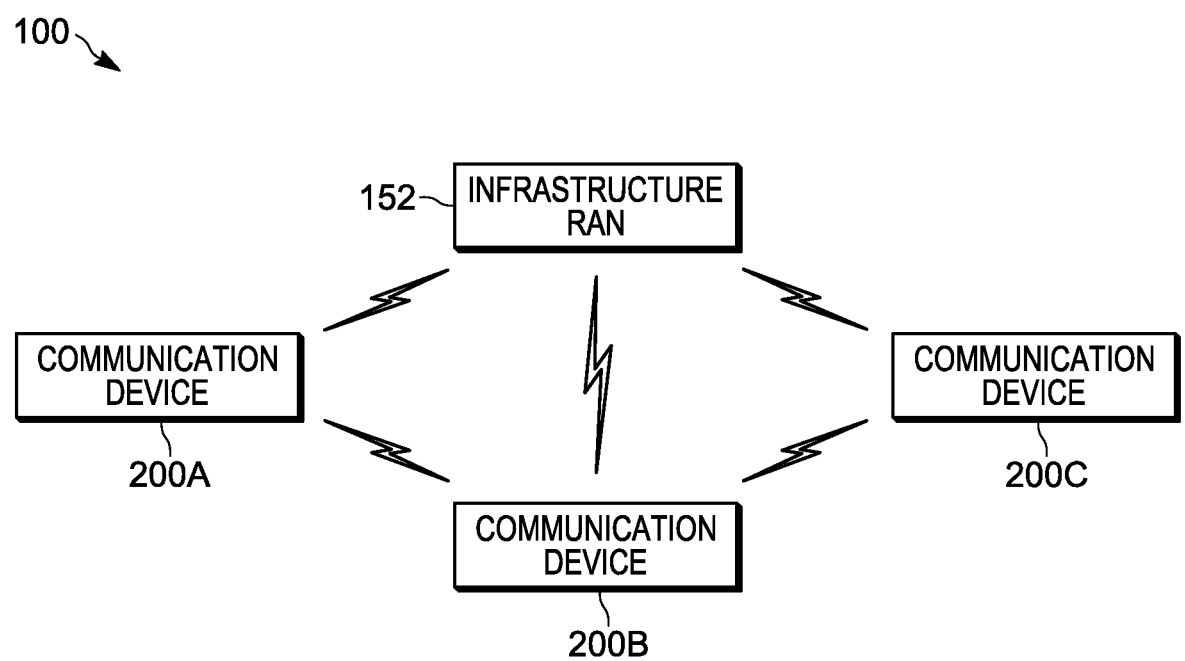

Referring now to the drawings, and in particular FIG. 1A, a communication system diagram illustrates a system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B. In some embodiments, the system 100 includes one or more tablets, interactive whiteboards, and/or other interactive displays that include an input device that is sensitive to contact from, for example, a stylus or a user's finger (and that may be referred to as a touch sensitive display). In some embodiments, one or both of the portable radio 104 and the laptop 114 include a touch sensitive display.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers. In some embodiments, the vehicle 132 may include one or more communication devices that include a touch sensitive display (for example, the mobile communication device 133).

Each of the portable radio 104, RSM video capture device 106, laptop 114, vehicular mobile communication device 133, and other devices may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The RAN 152 may be a wired or wireless communication network. All or parts of the RAN 152 may be implemented using various existing networks, for example, a land mobile radio (LMR) network, a Long Term Evolution (LTE) network, a Bluetooth™ network, a wireless local area network (for example, Wi-Fi), a Machine-to-machine (M2M) autonomous network, and a public switched telephone network. The RAN 152 may also include future developed networks. In some embodiments, the RAN 152 may also include a combination of the networks mentioned previously herein.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for fullduplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth™, Zigbee™, Bluetooth™ Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further communicate between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices. In some embodiments, a middleware server that translates between a narrowband system and a broadband system is disposed in infrastructure RAN 152 at infrastructure controller 156 or at a separate cloud computing cluster 162 communicably coupled to infrastructure controller 156 via internet protocol (IP) network 160, among other possibilities.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1A.

b. Device Structure

Figure 2:
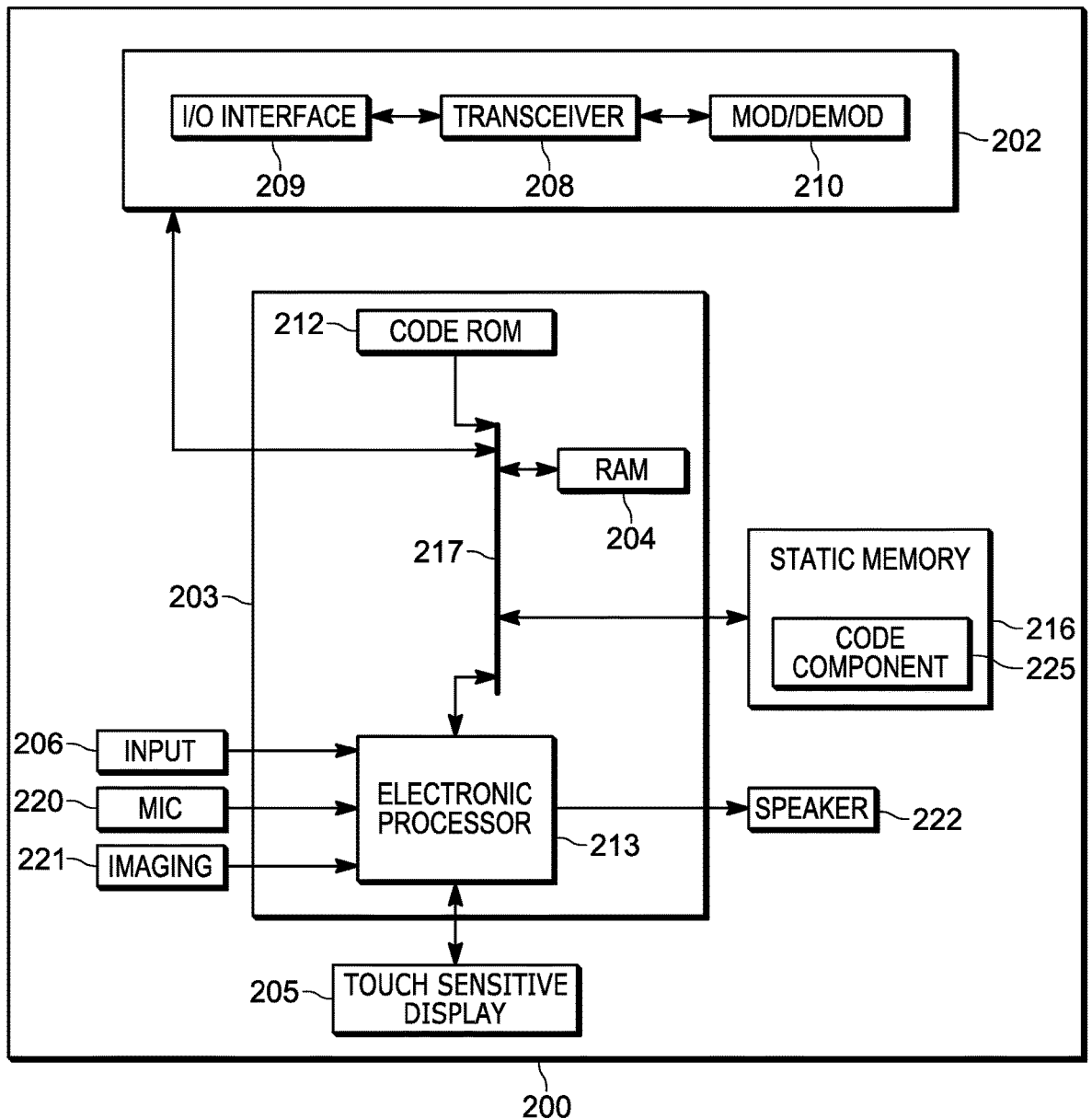
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, another communication device that includes a touch sensitive display (for example, a tablet, an interactive whiteboard, or the like), the mobile communication device 133, the infrastructure controller 156, the dispatch console 158, one or more computing devices in the cloud computing cluster 162, or some other communication device not illustrated in FIG. 1A, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 may not include one or more of the touch sensitive display 205, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203 that includes an electronic processor 213. The communication device 200 may also include one or more input devices (for example, a keypad, pointing device, a button, a touch sensitive display 205, a microphone 220, an imaging device 221, and/or another input device 206), each coupled to be in communication with the processing unit 203. In some instances, one or more communication devices 200 include a screen that is not touch sensitive in place of the touch sensitive display 205. For example, the communication device 200 acting as the portable radio 104 may include a screen that is not touch sensitive.

Figure 4A:
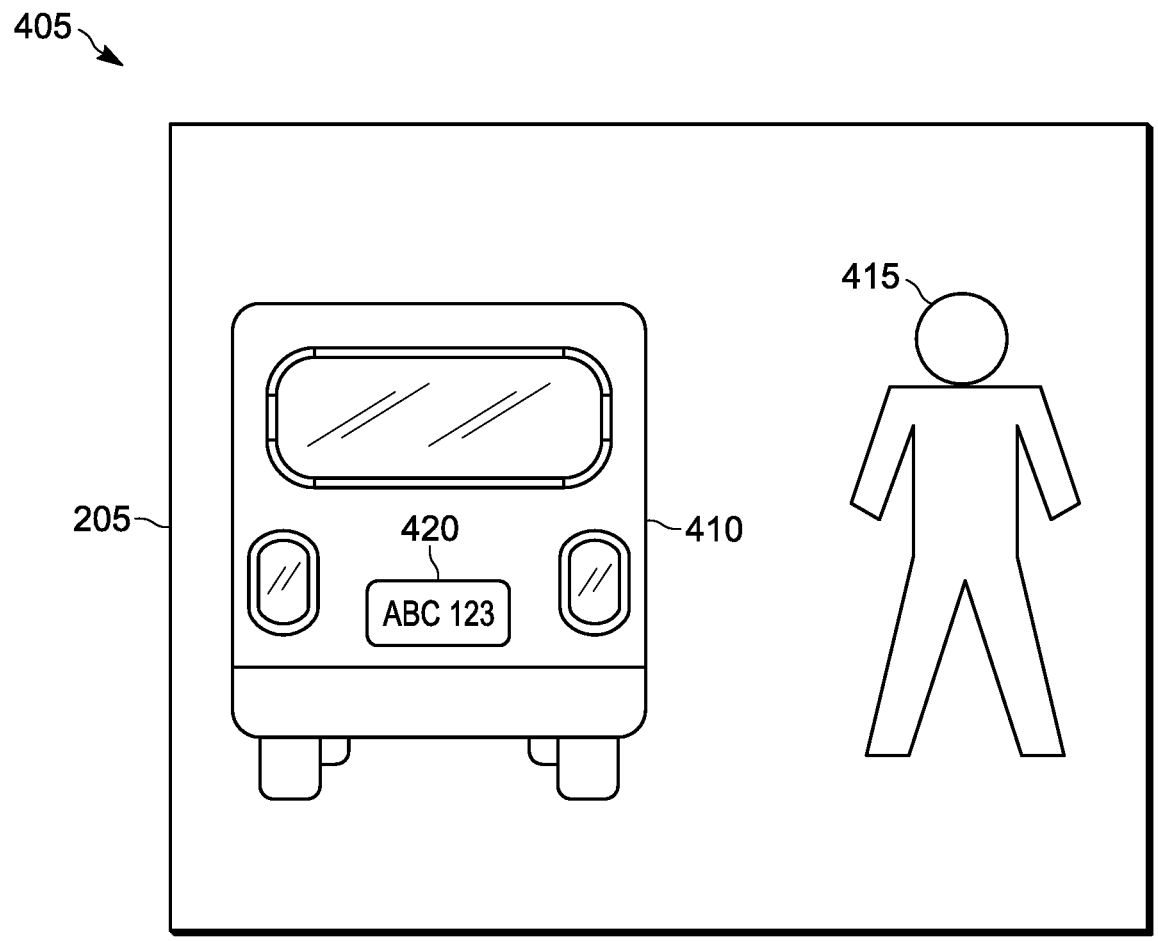
FIGS. 4A and 4B illustrate example graphical user interfaces of the touch sensitive display of the communication device of FIG. 2 in accordance with some embodiments.
Figure 4B:
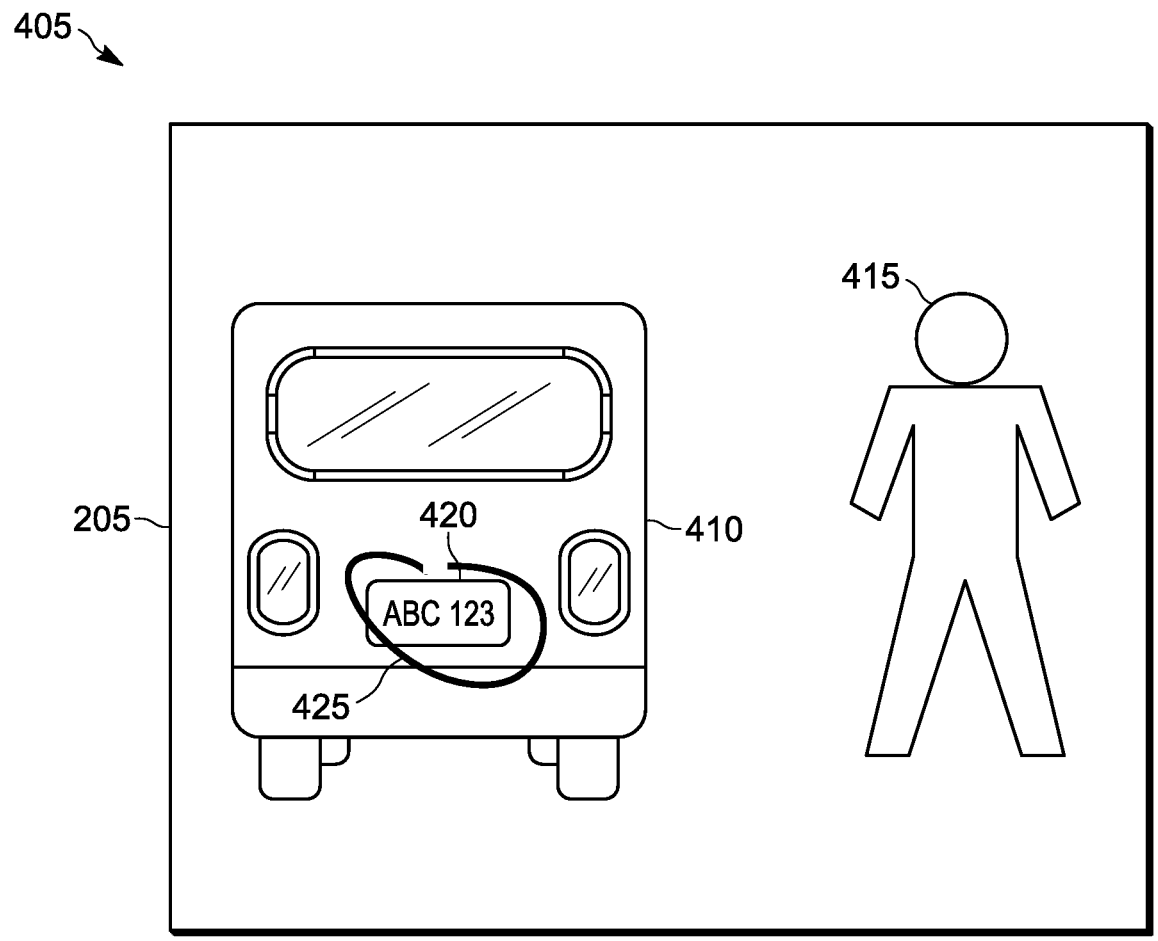

In some embodiments, the touch sensitive display 205 includes both a display device (for example, a liquid crystal display (LCD) screen panel, a projector, or the like) and a user input device (for example, a touch-sensitive component that detects contact by a stylus or finger). In some embodiments, the touch sensitive display 205 is a touch screen. The processing unit 203, and in particular, the electronic processor 213, may receive input signals from the touch sensitive display 205 that are generated when a user of the communication device 200 interacts with the touch sensitive display 205. In other words, the electronic processor 213 may read a gesture made by the user on the touch sensitive display 205. The electronic processor 213 may also control the display device of the touch sensitive display 205. For example, as shown in FIGS. 4A and 4B, the electronic processor 213 may provide a graphical user interface 405 on the touch sensitive display 205 of the communication device 200.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include the electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as a the portable radio 104, the laptop 114, the wireless RAN 152, and/or the mobile communication device 133.

For example, the communications unit 202 may include one or more wireless transceivers 208 configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the touch sensitive display 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Displaying Query Status Information on a Graphical User Interface In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of a tablet or interactive whiteboard). In other embodiments, the electronic computing device includes multiple electronic processors distributed remotely from each other. For example, the electronic computing device may be implemented on a combination of at least two of the electronic processor 213 of the tablet or interactive whiteboard, the electronic processor 213 of the infrastructure controller 156, and the electronic processor 213 of a back-end device in the cloud computing cluster 162 accessible via the IP network 160.

As one way to use the electronic digital assistant implemented by the electronic computing device, the user 102 may provide an oral query that is received by the microphone 220 of the communication device 200. The electronic computing device receives signals representative of the oral query from the microphone 220 and analyzes the signals to determine the content of the oral query. For example, the electronic computing device may include a natural language processing (NLP) engine configured to determine the intent and/or content of the oral query. The electronic computing device may also be configured to determine a response to the oral query (for example, by retrieving stored data or by requesting data from a database such as one of the databases 164) and provide the response to an output device of the communication device 200 (for example, one or more of the speaker 222 via a generated audio response and the touch sensitive display 205 via a generated text-based response). In other words, one or more of the communication devices 200, embodied in one or more of the communication devices of FIG. 1A, such as the portable radio 104, the tablet or interactive whiteboard, the infrastructure controller 156, and/or cloud computing cluster 162 may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 may submit a text query to the electronic computing device by typing the text query into a hard keyboard input device or a soft keyboard input provided on the touch sensitive display 205 of the communication device 200. As another example, the user 102 may use the imaging device 221 to capture an image or video of an area and press a hard or soft key to send the image or video to the electronic computing device to, for example, allow the electronic computing device to identify an object in the image or video. As another example, the user 102 may use the touch sensitive display 205 to make a gesture that causes the electronic computing device to generate a query based on the gesture as explained in greater detail below.

As mentioned above, there is a technological problem with how users interact with communication devices because such devices may not display the status of the user query or independent statuses of multiple independent user queries. Additionally, when responses to multiple user queries are generated in parallel over the same or overlapping periods of time, the display on such devices may become cluttered which may prevent information from being understood by the user.

Figure 3:
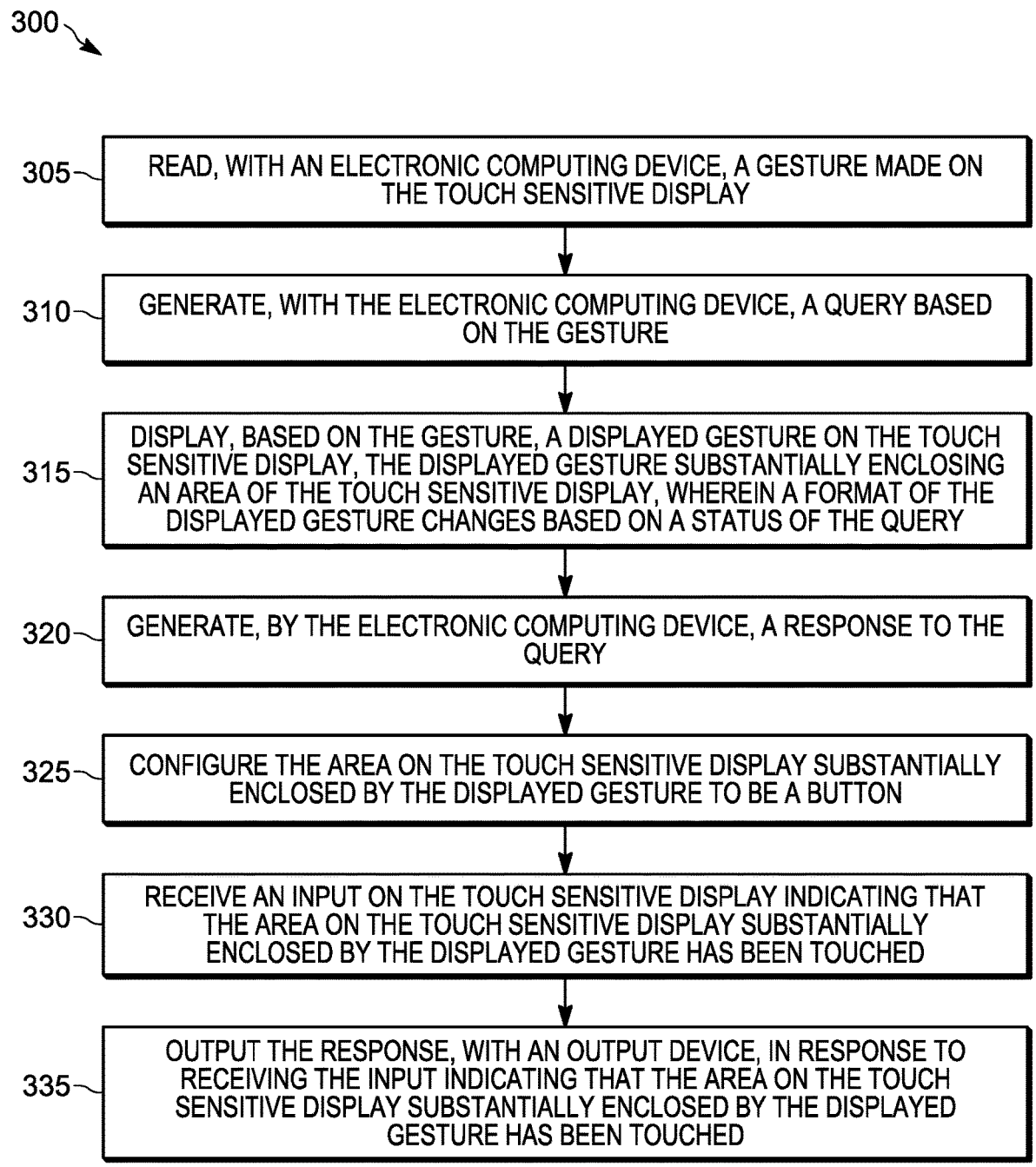
FIG. 3 illustrates a flow chart of a method of displaying query status information on a graphical user interface of a touch sensitive display of the communication device of FIG. 2 in accordance with some embodiments.

To solve these technological problems and to display query status information on a graphical user interface of the touch sensitive display 205, the electronic computing device that implements the electronic digital assistant may perform a method 300 illustrated in FIG. 3.

FIG. 3 illustrates a flow chart diagram of the method 300 performed by the electronic computing device for displaying query status information on a graphical user interface of the touch sensitive display 205. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic computing device reads a gesture made on the touch sensitive display 205. For example, as shown in FIG. 4A, a graphical user interface 405 of the touch sensitive display 205 may display an image that includes a vehicle 410 and a person 415. A gesture defines a periphery and may substantially surround or enclose an area or items on the touch sensitive display 205, in this case a license plate 420 of the vehicle 410 (as shown in FIG. 4B). In other words, the gesture may substantially encircle the license plate 420 to indicate that the user would like to obtain additional information associated with the license plate 420.

In some instances, a gesture may not fully enclose an object intended to be selected on the touch sensitive display 205 (for example, see the displayed gesture 425 of FIG. 4B). In this application, the term "substantially enclose" refers to gestures that are intended to select object(s) on the touch sensitive display 205. In addition to describing the displayed gesture 425 of FIG. 4B (that does not fully enclose the license plate 420), this term also describes gestures that fully enclose an object intended to be selected.

At block 310, the electronic computing device generates a query based on the gesture. Continuing the example shown in FIG. 4A, the electronic computing device may determine that the gesture substantially encloses the license plate 420. Based on this determination, the electronic computing device may generate a query that requests information associated with the license plate 420. For example, the electronic computing device may generate a query to determine an owner of the vehicle 410 or to determine whether the vehicle 410 has been reported as stolen. As another example, the electronic computing device may generate a query to determine whether the license plate 420 is expired. As a different example, the electronic computing device may determine that a different gesture substantially encloses a face of the person 415. Based on this determination, the electronic computing device may generate a query that requests information associated with the person 415 (for example, identification of the person 415, criminal record of the person 415, health information of the person 415 and the like).

In some embodiments, the electronic processor 213 of the communication device 200 with the touch sensitive display 205 determines that the gesture substantially encloses an object such as the license plate 420 or the face of the person 415. In such embodiments, the electronic processor 213 of the communication device 200 may use optical character recognition (OCR) to, for example, determine the characters on the license plate 420 and transmit the characters to another device to generate a response to the query. In other embodiments, the communication device 200 transmits image data corresponding to the area selected by the gesture to another device (for example, the cloud computing cluster 162) and one or more electronic processors of the other device may use optical character recognition to determine that characters on the license plate 420 to generate a response to the query.

At block 315, the electronic computing device displays, based on the gesture, a displayed gesture on the touch sensitive display 205. Continuing the example of FIG. 4A, FIG. 4B illustrates an example of a displayed gesture 425 on the touch sensitive display 205. As shown in FIG. 4B, the displayed gesture 425 substantially encloses an area of the touch sensitive display 205 (that is, the area including and surrounding the license plate 420). As explained in greater detail below, the electronic computing device controls a format of the displayed gesture 425 to change based on a status of the query. In the example shown in FIG. 4B, the displayed gesture 425 is a tracing of the gesture made on the touch sensitive display 205 by the user. In some embodiments, blocks 305, 310, and 315 may be performed by the electronic computing device at a speed that makes displaying of the displayed gesture 425 seem instantaneous with the user making the gesture. In other words, in some embodiments, the displayed gesture 425 appears to be displayed as the user is making the gesture.

In other embodiments, the displayed gesture 425 is based on the gesture made by the user but is different than the gesture made by the user. For example, the displayed gesture 425 may be a geometric shape that approximately corresponds to the gesture made on the touch sensitive display 205 by the user (for example, a circle, an oval, a rectangle, and the like). As another example, the displayed gesture 425 may be an outline of an object included in the area on the touch sensitive display 205 substantially enclosed by the gesture made by the user. In this example, the displayed gesture 425 automatically conforms to a regular shape (for example, a rectangle, oval, etc.) or "snap-fits" to the outline of an object such as the license plate 420 or the face of the person 415 in FIG. 4A.

At block 320, the electronic computing device generates a response to the query. In some embodiments, the electronic computing device retrieves stored data related to the object that is substantially enclosed by the displayed gesture 425 (for example, the license plate 420 and/or the person 415) from one or more memories to generate the response to the query (for example, from at least one of a memory on the communication device 200, the infrastructure controller 156, and a back-end device existing in the cloud computing cluster 162). In some embodiments, the electronic computing device requests data from one or more of the databases 164 to generate the response. For example, when the query relates to the license plate 420, the electronic computing device may retrieve or request information that relates to the license plate 420 as explained above (for example, vehicle owner information, whether the vehicle 410 has been reported stolen, whether the license plate 420 is expired, and the like). In some embodiments, the electronic computing device may use advanced license plate recognition (ALPR) to generate a response to the query. As another example, when the query relates to the person 415, the electronic computing device may retrieve or request information that relates to the person 415 as explained above (for example, identification of the person 415, criminal record of the person 415, health information of the person 415, and the like). In some embodiments, the electronic computing device may use facial recognition techniques when generating a response to the query.

In some embodiments, the electronic processor 213 of the communication device 200 with the touch sensitive display 205 retrieves or requests information to generate a response to the query. In other embodiments, the communication device 200 transmits the query to another device (for example, the cloud computing cluster 162) and one or more electronic processors of the other device retrieves or requests information to generate a response to the query. The other device then transmits the response to the query to the communication device 200.

As mentioned above, the electronic computing device controls a format of the displayed gesture 425 to change based on a status of the query. In some embodiments, the status of the query indicates the tasks that have been completed by the electronic computing device during the process of generating a response to the query. In some embodiments, the electronic computing device may control at least one of the group consisting of a color of the displayed gesture 425 and a line type of the displayed gesture 425 (for example, dashed, dotted, thickness/weight, and the like) based on a status of the query. For example, when the electronic computing device reads the gesture (at block 305) and displays the displayed gesture 425 (at block 315), the displayed gesture 425 may be displayed using a line with a first color (for example, red) and a first line type (for example, solid). When the electronic computing device generates the query (at block 310), the displayed gesture may be displayed using a line with the first color and a second line type (for example, dashed). When the electronic computing device generates a response to the query (at block 320), the displayed gesture may be displayed using a line with a second color (for example, green) and the first line type (for example, solid). Accordingly, the touch sensitive display 205 indicates the status of the query to the user.

Other examples of statuses of the query that may cause the electronic computing device to change the format of the displayed gesture 425 include, but are not limited to, the query being transmitted from the communication device 200, the response to the query being received by the communication device 200, and one or more electronic processors requesting information related to the query (for example, license plate information being requested from the database 164). In some instances, the status of the query may be generated by the communication device 200 that includes the touch sensitive display 205. For example, such a communication device 200 is capable of determining when a query is transmitted to an electronic processor of another device and when a response to the query is received from an electronic processor of another device. As another example, when such a communication device 200 generates a response to the query itself, the communication device 200 is capable of determining when the response to the query has been generated. In other instances, the status of the query is communicated to the communication device 200 from another device (for example, the cloud computing cluster 162). For example, when a query has been transmitted to the cloud computing cluster 162, the cloud computing cluster 162 may communicate with the communication device 200 to indicate that the cloud computing cluster 162 is requesting information from the database 164 to generate a response to the query.

At block 325, the electronic computing device configures the area on the touch sensitive display 205 substantially enclosed by the displayed gesture 425 to be a button. In some embodiments, the electronic computing device configures this area to be a button in response to the response to the query being generated or received. In some embodiments, the electronic computing device further changes the format of the displayed gesture 425 in response to the query being generated or received to indicate that the area on the touch sensitive display 205 substantially enclosed by the displayed gesture 425 has become a button. For example, the electronic computing device may increase the thickness of the line of the displayed gesture 425 or add shading to the area on the touch sensitive display 205 substantially enclosed by the displayed gesture 425.

At block 330, the touch sensitive display 205 receives an input indicating that the area on the touch sensitive display 205 substantially enclosed by the displayed gesture has been touched (in other words, the area has been selected by the user).

At block 335, the electronic computing device outputs the response to the query, with an output device, in response to receiving the input indicating that the area on the touch sensitive display 205 substantially enclosed by the displayed gesture 425 has been touched. In some embodiments, the output device is the touch sensitive display 205. In such embodiments, the response to the query is visually displayed on the touch sensitive display 205 and may be viewed by the user. In other embodiments, the output device is the speaker 222 of the communication device 200. In such embodiments, the response to the query is audibly conveyed and may be heard by the user. In some embodiments, the response to the query is both visually and audibly conveyed.

In some embodiments, when generating the response the query, the electronic computing device determines a proposed action that relates to the query. For example, when the electronic computing device determines that the displayed gesture substantially encloses a location on a map, the electronic computing device may generate information about the location (for example, description of the location, images and/or video of the location, whether the location has recently been reported as the scene of a public safety incident, and the like). Continuing this example, the electronic computing device may determine that a public safety incident (for example, a fire, a riot, or the like) is occurring at the location. In such situations, when providing the response to the query, the electronic computing device may display a proposed action within or near the area substantially enclosed by the displayed gesture. In some embodiments, the electronic computing device is configured to transmit information (that is, the proposed action) to a second electronic computing device (associated with a different user) in response to receiving the input indicating that the area on the touch sensitive display 205 substantially enclosed by the displayed gesture has been touched. For example, the proposed action may be to dispatch available public safety personnel to the location or to notify public safety personnel near the location that an incident is occurring at the location. In such embodiments, configuring the area substantially enclosed by the displayed gesture as a button allows the user to confirm, by touching the area substantially enclosed by the displayed gesture, that the electronic computing device should execute the proposed action.

In some embodiments, the electronic computing device ceases displaying the displayed gesture (for example, displayed gesture 425 of FIG. 4B) after a predetermined time has elapsed since the input has been received indicating that the area on the touch sensitive display 205 substantially enclosed by the displayed gesture has been touched. In some embodiments, the electronic computing device ceases displaying the displayed gesture after the response to the query has been generated and the area on the touch sensitive display 205 substantially enclosed by the displayed gesture has not been touched for a predetermined period of time. Such embodiments prevent the touch sensitive display 205 from continuing to display stale responses that may clutter the touch sensitive display 205 and prevent information from being understood by a user.

Although the above explanation of the method 300 involved a single query and response, in some embodiments, the electronic computing device executes the method 300 in parallel for a plurality of gestures made on the touch sensitive display 205. For example, before generating the response to the query (at block 320), the electronic computing device may read a second gesture made on the touch sensitive display 205 and generate a second query based on the second gesture. The electronic computing device then displays a second displayed gesture based on the second gesture. Similar to the changing of the format of the displayed gesture explained above, the electronic computing device changes a format of the second displayed gesture based on a status of the second query. The format of the second displayed gesture is independent of the format of the displayed gesture explained above. In such embodiments, multiple independent query statuses are displayed such that the user may identify the status of each query individually (in other words, multiple query-in-progress states are displayed). Although the above example includes two displayed gestures, in some embodiments, the electronic computing device may execute the method 300 in parallel for more than two displayed gestures and associated queries.

In some embodiments, the gesture read by the electronic computing device (at block 305) substantially encloses multiple objects of interest (that is, an object on which a query may be performed such as a face, license plate, vehicle, logo, and the like) on the graphical user interface 405 of the touch sensitive display 205. For example, with reference to FIG. 4A, a gesture may substantially enclose the license plate 420 and the face of the person 415. In some embodiments, the electronic computing device determines that the gesture made on the touch sensitive display 205 substantially encloses a plurality of objects of interest (for example, using image identification software that identifies predetermined objects in an image). The electronic computing device then generates a respective query based on each of the objects of interest of the plurality of objects of interest in a similar manner as described above (at block 310). The electronic computing device also displays a respective displayed gesture on the touch sensitive display 205 corresponding to each of the objects of interest. These displayed gestures may be similar to the displayed gesture 425 described above (at block 315). For example, the displayed gesture corresponding to the face of the person 415 may approximately outline the face of the person 415. Similarly, as another example, the displayed gesture corresponding to the license plate 420 may approximately outline the license plate 420. Also similar to the embodiment described above, a respective format of each of the displayed gestures is based on a status of the respective queries. In other words, the electronic computing device changes a respective format of each of the displayed gestures based on a status of the respective queries. Although the above example includes two objects of interest, in some embodiments, the electronic computing device identifies more than two objects of interest and similarly executes the method 300 for these additional objects of interest.

Although the method 300 is described as having the electronic computing device generate the query based on the gesture made on the touch sensitive display 205 (at block 310), in some embodiments, the electronic computing device may generate the query based on an oral query or a typed input. For example, with respect to FIG. 4A, an oral query may ask for additional information relating to the license plate 420 shown on the graphical user interface 405 of the touch sensitive display 205. The electronic computing device may identify the license plate 420 in the displayed image (for example, using image identification software that identifies predetermined objects in an image) and execute the remaining blocks of the method 300 as explained above.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. An electronic computing device comprising:
a touch sensitive display; and
one or more electronic processors communicatively coupled to the touch sensitive display, the one or more electronic processors configured to
read a gesture made on the touch sensitive display, wherein the gesture substantially encloses an object displayed on the touch sensitive display,
generate a query based on the gesture,
display, based on the gesture, a displayed gesture on the touch sensitive display, the displayed gesture being displayed in a first format and substantially enclosing the object, wherein the displayed gesture includes a line corresponding to a tracing of the gesture made on the touch sensitive display,
in response to generating the query, display the displayed gesture on the touch sensitive display in a second format different from the first format to indicate that the query has been generated, wherein the displayed gesture in the second format includes the line corresponding to the tracing of the gesture made on the touch sensitive display,
generate a response to the query, wherein the response to the query includes data about the object,
in response to generating the response to the query, display the displayed gesture on the touch sensitive display in a third format different from the first format and the second format, wherein displaying the displayed gesture in the third format includes configuring an area on the touch sensitive display substantially enclosed by the line of the displayed gesture to be a button, wherein the displayed gesture in the third format includes the line corresponding to the tracing of the gesture made on the touch sensitive display such that the line of the displayed gesture continues to be displayed after generating the response to the query,
receive an input on the touch sensitive display indicating that the area on the touch sensitive display substantially enclosed by the line of the displayed gesture has been touched, and
output the response, with an output device, in response to receiving the input indicating that the area on the touch sensitive display substantially enclosed by the line of the displayed gesture has been touched.

2. The electronic computing device of claim 1, wherein the second format of the displayed gesture changes based on a status of the query.

3. The electronic computing device of claim 2, wherein the status of the query indicates at least one of the group consisting of that the query has been transmitted from a communication device and that the one or more electronic processors are retrieving information related to the query.

4. The electronic computing device of claim 2, wherein, before generating the response to the query, the one or more electronic processors are further configured to
read a second gesture made on the touch sensitive display, generate a second query based on the second gesture, and display, based on the second gesture, a second displayed gesture on the touch sensitive display, wherein a fourth format of the second displayed gesture is independent of the first, second, and third format of the first displayed gesture, and the fourth format of the second displayed gesture is based on a status of the second query.

5. The electronic computing device of claim 2, wherein the second format of the displayed gesture that changes based on the status of the query is at least one of the group consisting of a color of the line of the displayed gesture and a line type of the line of the displayed gesture.

6. The electronic computing device of claim 1, wherein the one or more electronic processors are further configured to cease displaying the displayed gesture after a predetermined time has elapsed since the input has been received indicating that the area on the touch sensitive display substantially enclosed by the line of the displayed gesture has been touched.

7. The electronic computing device of claim 1, wherein the one or more electronic processors are further configured to transmit information to a second electronic computing device in response to receiving the input indicating that the area on the touch sensitive display substantially enclosed by the line of the displayed gesture has been touched.

8. The electronic computing device of claim 1, wherein the one or more electronic processors are further configured to
determine that the gesture made on the touch sensitive display substantially encloses a plurality of objects of interest,
generate a respective query based on each of the objects of interest of the plurality of objects of interest, and
display a respective displayed gesture on the touch sensitive display corresponding to each of the objects of interest of the plurality of objects of interest, wherein a respective format of each of the displayed gestures is based on a status of the respective queries.

9. The electronic computing device of claim 1, wherein the output device is at least one of the group consisting of the touch sensitive display and a speaker.

10. The electronic computing device of claim 1, wherein the one or more electronic processors are further configured to display an image on the touch sensitive display, the image being captured by an imaging device, wherein the object is included within the image.

11. A method of displaying query status information on a graphical user interface, the method comprising:
reading, with an electronic computing device, a gesture made on the touch sensitive display, wherein the gesture substantially encloses an object displayed on the touch sensitive display;
generating, with the electronic computing device, a query based on the gesture;
displaying, based on the gesture, a displayed gesture on the touch sensitive display, the displayed gesture being displayed in a first format and substantially enclosing the object, wherein the displayed gesture includes a line corresponding to a tracing of the gesture made on the touch sensitive display;
in response to generating the query, display the displayed gesture on the touch sensitive display in a second format different from the first format to indicate that the query has been generated, wherein the displayed gesture in the second format includes the line corresponding to the tracing of the gesture made on the touch sensitive display;
generating, with the electronic computing device, a response to the query, wherein the response to the query includes data about the object,
in response to generating the response to the query, displaying the displayed gesture on the touch sensitive display in a third format different from the first format and the second format, wherein displaying the displayed gesture in the third format includes configuring, with the electronic computing device, the area on the touch sensitive display substantially enclosed by the displayed gesture to be a button, wherein the displayed gesture in the third format includes the line corresponding to the tracing of the gesture made on the touch sensitive display such that the line of the displayed gesture continues to be displayed after generating the response to the query;
receiving an input on the touch sensitive display indicating that the area on the touch sensitive display substantially enclosed by the line of the displayed gesture has been touched; and
outputting the response, with an output device, in response to receiving the input indicating that the area on the touch sensitive display substantially enclosed by the line of the displayed gesture has been touched.

12. The method of claim 11, wherein displaying the displayed gesture on the touch sensitive display in the second format includes changing the second format of the displayed gesture based on a status of the query.

13. The method of claim 12, wherein changing the second format of the displayed gesture based on the status of the query includes changing the second format of the displayed gesture based on at least one of the group consisting of the query being generated, the query being transmitted from a communication device, and one or more electronic processors of the electronic computing device retrieving information related to the query.

14. The method of claim 12, further comprising, before generating the response to the query:
reading, with the electronic computing device, a second gesture made on the touch sensitive display;
generating, with the electronic computing device, a second query based on the second gesture; and
displaying, based on the second gesture, a second displayed gesture on the touch sensitive display, wherein a fourth format of the second displayed gesture is independent of the first, second, and third format of the first displayed gesture, and the fourth format of the second displayed gesture is based on a status of the second query.

15. The method of claim 12, wherein displaying the displayed gesture on the touch sensitive display in the second format includes changing at least one of the group consisting of a color of the line of the displayed gesture and a line type of the line of the displayed gesture.

16. The method of claim 11, further comprising ceasing to display the displayed gesture after a predetermined time has elapsed since the input has been received indicating that the area on the touch sensitive display substantially enclosed by the line of the displayed gesture has been touched.

17. The method of claim 11, further comprising transmitting, with the electronic computing device, information to a second electronic computing device in response to receiving the input indicating that the area on the touch sensitive display substantially enclosed by the line of the displayed gesture has been touched.

18. The method of claim 11, further comprising:
   determining, with the electronic computing device, that the gesture made on the touch sensitive display substantially encloses a plurality of objects of interest;
   generating, with the electronic computing device, a respective query based on each of the objects of interest of the plurality of objects of interest; and
   displaying a respective displayed gesture on the touch sensitive display corresponding to each of the objects of interest of the plurality of objects of interest, wherein a respective format of each of the displayed gestures is based on a status of the respective queries.

19. The method of claim 11, wherein outputting the response includes at least one of outputting a visual response on the touch sensitive display and outputting an audible response on a speaker.

20. The method of claim 11, further comprising displaying an image on the touch sensitive display, the image being captured by an imaging device, wherein the object is included within the image.

* * * * *